UNITED STATES PATENT OFFICE 2,675,345

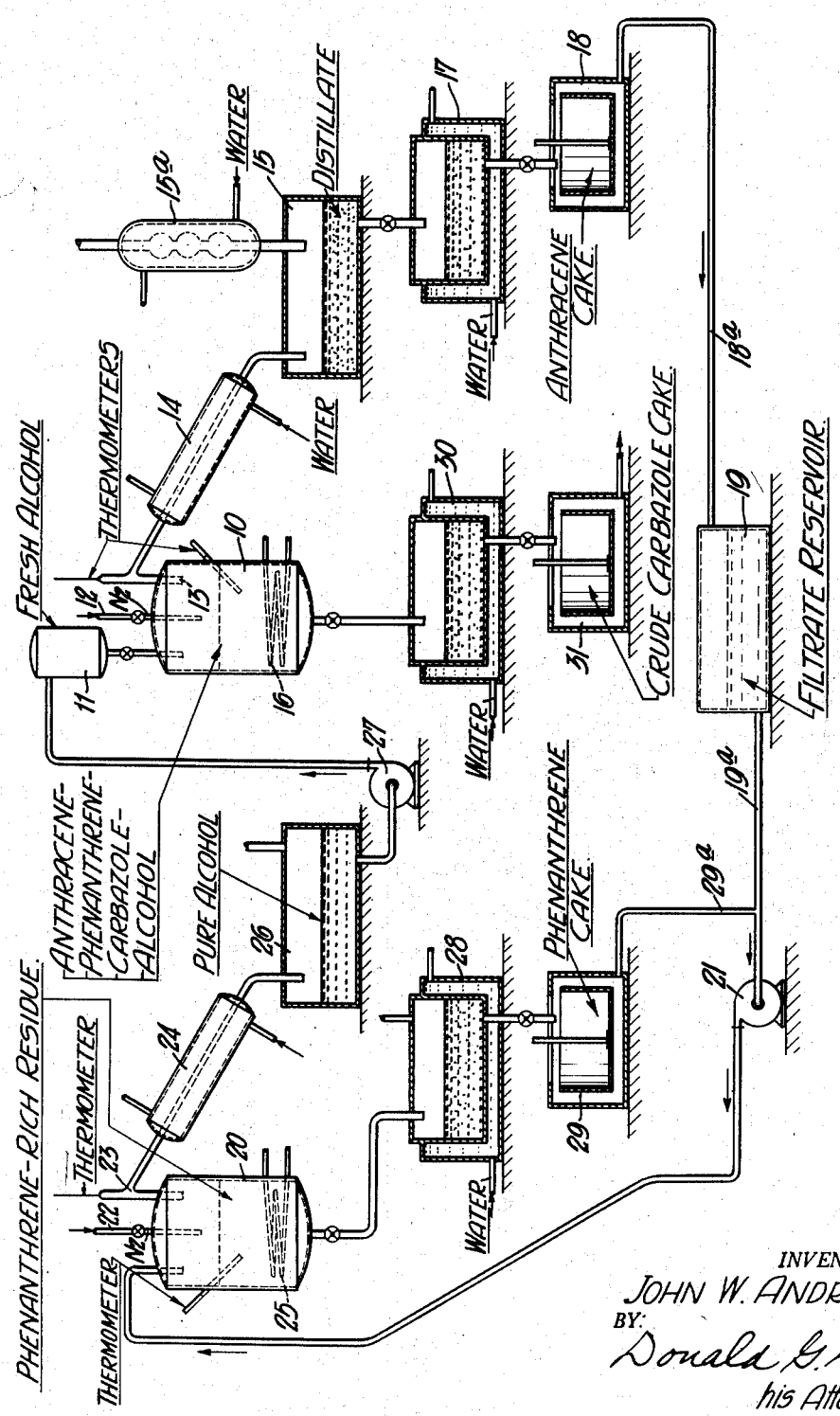

METHOD FOR SEPARATING ANTHRACENE AND PHENANTHRENE FROM CARBAZOLE

John W. Andrews, Pittsburgh, Pa., assignor to United States Steel Corporation, a corporation of New Jersey Application March 5, 1952, Serial No. 274,934

3 Claims. (Cl. 202—57)

This invention relates to the treatment of the solids crystallized from solution in anthracene oil or the heavy creosote fraction obtained from the distillation of tar, in order to recover the ingredients thereof in a relatively pure form.

The solute of anthracene oil which crystallizes on cooling is primarly a mixture of anthracene, phenanthrene and carbazole. These compounds have been separable heretofore only by selective solvents but it has been difficult to secure a product of high purity except by multiple treatments which increase the cost.

I have invented a novel process for achieving the desired separation at low cost by distilling semi-refined anthracene cake initially containing less than 50% carbazole, utilizing as a solvent and carrier a saturated monohydric alcohol. Such alcohol acts as a distilling carrier for anthracene and phenanthrene and carries them off together leaving the carbazole behind. Cooling of the distillate causes the anthracene to crystallize so it can be collected by filtration. The alcohol is then distilled from the filtrate leaving high-purity phenanthrene. Cooling of the residue from the first distillation causes crystallization of the carbazole which may then be recovered by filtration.

A complete understanding of the invention may be obtained from the following detailed description and explanation which refer to the accompanying drawing, the single figure of which is a diagrammatic flow sheet illustrating the invention schematically.

Referring in detail to the drawing, a still chamber 10 has an alcohol tank 11 connected thereto, a nitrogen inlet 12 and a vapor outlet 13 to which is connected a condenser 14. Semi-refined anthracene cake is charged into chamber 10 to the desired amount and heated as by means of a steam coil 16, after nitrogen has been admitted through inlet 12 to displace any air in the chamber, and an alcohol such as octanol-1 has been admitted from tank 11. After distillation starts, the nitrogen supply is shut off and more alcohol is added to provide a solvent and distilling medium. The alcohol is added from time to time or steadily at a controlled rate such as to maintain the weight ratio of alcohol to solute in still 10, at less than unity. The heating is controlled to keep the solution about 20° C. above the boiling point of the alcohol used and to boil the fresh alcohol supplied. Thermometers T permit the temperatures of the liquid and vapor to be observed. Boiling of the solution causes the anthracene and phenanthrene to be distilled off, leaving carbazole as one of the residue constituents in the alcohol remaining behind.

The alcohols which are satisfactory for use as carrying agents are saturated monohydric alcohols of the primary or secondary type, having from six to twelve carbon atoms and a boiling point within the range of from 160 to 230° C. Such alcohols are particularly advantageous in my process for several reasons. First, the monohydric alcohols are highly polarized compounds in their vapor state and thus very well disposed to forming azeotropes with non-polar compounds such as anthracene and phenanthrene. Second, these alcohols are stable at boiling temperature both alone and in the presence of the mixtures to be separated (only saturated primary or secondary alcohols fall in this category under atmospheric pressure conditions; all tertiary alcohols are excluded). Third, the boiling temperatures of these alcohols are above 160° C. at atmospheric pressure so that the vapor pressures of anthracene and phenanthrene are sufficiently high at such temperatures to produce distillation rates suitable for practical operations. Alcohols having boiling temperatures over 230° C. show not only increased tendencies toward carrying carbazole over into the distillate but also rapid decomposition. Fourth, the solubility of anthracene in these alcohols is low at room temperature but high at the boiling point. In contrast, the solubility of phenanthrene is high at both high and low temperatures. Carbazole also has a high solubility at the boiling point. These solubility characteristics facilitate separation of anthracene from phenanthrene in the distillate and insure complete solution of all constituents in the alcohol during distillation. It has been found that the solubility of anthracene at 25° C. in alcohols having the above requirements is 1 to 5 grams per liter, while that of phenanthrene is from fifteen to twenty times greater. The solubility of carbazole is from two to four times that of anthracene at 25° C. The dihydric alcohols, of which ethylene glycol, propylene glycol, and trimethylene glycol are typical examples, do not fulfill these requirements because their solubility for phenanthrene is only slightly greater at room temperature than that for anthracene.

The alcohols which have been tested and found to be satisfactory for the purposes of my invention include:

Hexanol-1
Di- or tri-methyl cyclohexanols
2- or 5-methyl hexanol-1
Heptanol-1

Octanols-1 or -2
Iso-octyl alcohol
2-ethyl hexanol-1
Beta phenyl ethyl alcohol
Nonanol-1
3-, 5-, 5-trimethyl hexanol-1
Di-isobutyl carbinol
Gamma phenyl propyl alcohol
Decanol-1
Dihydro alpha terpineol
Undecanol-1

Other alcohols belonging to the same classification may be used instead of those named. The latter, however, are sufficient to cover most practical applications. Pertinent data for some of them are given below:

TABLE I

*The solubilities of anthracene, phenanthrene, and carbazole in certain alcohols at 25° C.*

| Solvent | Boiling Point (° C.) | Maximum Solubilities at 25° C. (grams/liter) | | |
|---|---|---|---|---|
| | | Anthracene | Phenanthrene | Carbazole |
| 1. Dihydro-alpha Terpineol | 209 | 3.5 | 74.3 | 10.7 |
| 2. Octanol-1 | 191–4 | 3.3 | 60.6 | 8.4 |
| 3. Octanol-2 | 178–180 | 4.0 | 56.0 | 8.0 |
| 4. 3,5,5-Trimethyl Hexanol | 193–5 | 1.6 | 30.2 | 5.0 |
| 5. Di-isobutyl Carbinol | 175–7 | 1.8 | 68.7 | 4.2 |
| 6. Diacetone Alcohol | 169 | 4.4 | 100 | 43.5 |
| 7. 2-Ethyl Hexanol-1 | 183–6 | 2.0 | 43.2 | 4.8 |
| 8. Heptanol-1 | 174–6 | 3.6 | 53.0 | 10.2 |

TABLE II

*The efficiencies of certain alcohols as distillation carriers for anthracene, phenanthrene, and carbazole*

| Distillation Carrier | Distillation Temp. (° C.) | Pot Ratio (Alcohol/Solute) | Distillate Ratio (Alcohol/Solute) | | |
|---|---|---|---|---|---|
| | | | Solutes | | |
| | | | Anthracene [1] | Phenanthrene [2] | Carbazole [3] |
| 1. Dihydroalpha-Terpineol | 214–16 | 0.63–0.64 | 17.2 | | |
| | | 0.55–0.56 | | 10.5 | |
| | | 0.49–0.55 | | | 21.3 |
| 2. Octanol-1 | 189–95 | 0.3–0.4 | 20.0 | | |
| | | 0.3–0.5 | | 23.6 | |
| | | 0.4–0.7 | | | 60.0 |
| 3. Octanol-2 | 175–9 | 0.4–0.5 | 40–45 | | |
| | | 0.3–0.4 | | 45–50 | |
| 4. 3, 5, 5-Trimethyl Hexanol-1 | 190–4 | 0.5–0.9 | 39.6 | | |
| | | 0.5–0.9 | | 46.1 | |
| 5. Diisobutyl Carbinol | 175–80 | 0.16–0.32 | 43.7 | | |
| | | 0.24–0.47 | | 40.0 | |
| 4. Diacetone Alcohol [4] | 159–65 | 0.8–1.0 | 70 | | |
| | | 0.8–1.0 | | 33 | |
| 7. 2-Ethyl Hexanol-1 | 178–82 | 0.8–1.0 | 73.4 | | |
| | | 0.6–0.8 | | 76–4 | |
| 8. Heptanol-1 | 167–75 | 0.2–1.0 | 70.0 | | |
| | | 0.2–0.9 | | 91.1 | |

[1] Pot solute analyzed 93% anthracene.
[2] Pot solute analyzed 97% phenanthrene.
[3] Pot solute analyzed 98% carbazole.
[4] The carrier is soluble in water.

Vapor from still 10 may be cooled in condenser 14 or conducted directly to a primary cooling chamber 15 having a reflux condenser 15a, and there condensed by cooling to a temperature above the crystallizing temperature of anthracene, i. e., a temperature within from 10 to 20° C. of the boiling point of the alcohol. The condensed solution is periodically transferred to a secondary cooler 17 where it is cooled substantially to room temperature. This causes crystallization of the anthracene but not the phenanthrene, because of the difference between the solubility of the two in the alcohol at room temperature. The phenanthrene solution is separated from the anthracene crystals in centrifuge 18. When the anthracene thus collected is washed and dried it is found to have a purity between 90 and 98%.

The phenanthrene solution flows through a connection 18a to a tank 19 from which periodically a second still 20 is charged by a pump 21, through a connection 19a. In addition to the inlet for the solution, still 20 has a nitrogen inlet 22 for removing air and a vapor outlet 23 to which a condenser 24 is connected. The still also has a heating coil 25 therein. When the phenanthrene solution is boiled, part of the alcohol distills off, is condensed in condenser 24 and collected in a tank 26, whence it is periodically returned to tank 11 by a pump 27. When the temperature of the solution in still 20 exceeds that of the vapor issuing therefrom by 10° C., the residue is drained to a cooler 28 where it is cooled to room temperature causing crystallization of phenanthrene. The crystals are removed from the solution in a centrifuge 29, the filtrate from which is recycled through still 20 by a connection 29a. The phenanthrene crystals have a purity of between 80 and 90%.

When the carbazole concentration in the solute of the residue in still 10 reaches 50%, distillation is discontinued and the residue is drained to cooler 30 where it is cooled causing crystallization of a crude carbazole product. The crystals are separated from the solution by a centrifuge 31, the filtrate from which may be returned to still 10 or discarded.

It will be apparent from the foregoing that the present invention permits a simple and economical separation of anthracene and phenanthrene in a one-step process from semi-refined anthracene cake of the type easily recovered from the anthracene-oil fraction obtained from the distillation of coal tar. Both constituents are removed from mixtures containing carbazole in a single distillation step which involves the use of a high-boiling alcohol as a distilling carrier. The resulting distillate yields crystalline anthracene of 90-98% purity upon cooling to room temperature (25-30° C.). Crystalline phenanthrene of 80-90% purity is then obtained from the remaining solution by distilling off the alcohol solvent.

The first distillation step referred to above requires only three conditions, viz.;

(a) An alcohol belonging to the class of compounds described must be used as a carrying agent.
(b) The mixture in the still must consist of alcohol and crude solute in a weight ratio held constant at some value below 1.0.
(c) The crude solute must not contain more than 50% carbazole.

There is evidence that these conditions control the formation of azeotropes between the alcohol and the solutes, anthracene, phenanthrene and carbazole. It is furthermore believed that some type of interaction between these solutes, as yet not completely understood, is responsible for preventing the alcohol-carbazole azeotrope from forming until the carbazole concentration in the still 10 exceeds 50%.

Under the above conditions, only anthracene and phenanthrene will appear in the distillate from still 10, the former being insoluble at room temperatures in the alcohol and the latter having a solubility limit considerably in excess of its actual concentration. The anthracene product thus obtained is crystalline, free of carbazole, and has a purity of 90-98%. The phenanthrene product is also crystalline and free of carbazole and has a purity of 80-90%. The impurities present in these two products, respectively, are phenanthrene and anthracene.

The distillation in still 10 may also be carried out under reduced pressure. The carbazole content of the still solute can then be allowed to rise above 50% without affecting the composition of the distillate.

Numerous other variations of the procedure described above may be made without involving operational procedures beyond those commonly employed by operators of chemical plants. It is to be understood that any such modifications fall within the scope of this invention.

Although I have disclosed herein the present preferred embodiment of my invention, I intend to cover as well any change or modification therein which may be made without departing from the spirit and scope of the invention.

I claim:

1. In a method of separating anthracene, phenanthrene and carbazole from mixtures thereof initially containing less than 50% carbazole, the steps including adding to the mixture an alcohol selected from the group consisting of primary and secondary saturated monohydric alcohols containing from six to twelve carbon atoms and having a boiling point between 165 and 230° C., distilling the resulting solution, cooling the distillate, thereby causing crystallization of the anthracene and continuing the addition of said alcohol during the distillation to maintain the weight ratio of alcohol to solute at less than unity.

2. The method defined by claim 1 characterized by discontinuing the distillation when the carbazole in the solution amounts to 50% of the solute.

3. The method defined by claim 1 characterized by said alcohol being selected from the group consisting of octanol-1 and dihydro-alpha-terpineol.

References Cited in the file of this patent

UNITED STATES PATENTS

| Number | Name | Date |
|---|---|---|
| 1,548,920 | Weil | Aug. 11, 1925 |
| 1,764,031 | Norton | June 17, 1930 |
| 1,892,772 | Jaeger et al. | Jan. 3, 1933 |
| 2,213,755 | Yule | Sept. 3, 1940 |
| 2,590,096 | Feldman et al. | Mar. 25, 1952 |